March 18, 1958 R. D. ALLISON 2,827,223

ONE PIECE ENVELOPE OR JACKET FOR DISC RECORDS

Filed March 5, 1953

INVENTOR

ROBERT D. ALLISON

BY Geo. H. Kennedy, Jr.

ATTORNEY 2,827,223

ONE PIECE ENVELOPE OR JACKET FOR DISC RECORDS

Robert D. Allison, West Hartford, Conn., assignor to United States Envelope Company, Springfield, Mass., a corporation of Maine Application March 5, 1953, Serial No. 340,481

6 Claims. (Cl. 229—68)

This invention relates to envelopes or jackets of inexpensive one piece construction for the snug containment of disc type phonograph records, and for the latter's safe storage, when so contained, in stack or tier formation.

In disc record jackets of conventional one piece construction (typified by the jacket of Modes Patent No. 2,480,416, dated August 30, 1949) the opposite jacket walls are connected along two edges by integral infolded flaps, which provide a pair of double thickness seams of uniform width, along said edges and wholly within the area defined by the record pocket's boundary folds. At their central portions, these conventional double thickness jacket seams always cover or overlap small segmental areas of a contained record's sound track, by reason of the latter's proximity to the record's outer peripheral edge, to which the flap folds are tangent. Consequently, when so-jacketed disc records are stored in stack formation, there is always an undue concentration of stack weight on these two small segmental seam-covered sound track areas of each record; this weight concentration, especially with disc records made from pressure-sensitive or heat-sensitive materials, such as vinyl plastics and the like, is frequently ruinous, in its distorting and flattening effects on these two small areas of a record's sound track.

As a remedy for this situation, it has been proposed, by Franck Patent No. 2,512,577, dated June 20, 1950, to extend the infolded seaming flaps over the entire area of the record pocket, producing thereby a jacket wall which is of double thickness throughout, so as to obtain on a contained record's sound track, not any localized concentration of stack weight, but rather a uniform distribution of such stack weight.

But this patented Franck jacket, because of requiring so much excess paper stock for its manufacture, cannot compete, on a cost basis, with any of the conventionally constructed one piece record jackets. Nor can it reduce or relieve, in the slightest degree, the full load or weight of a superposed record stack on a contained record's sound track. Any such stack load relief, practically a necessity with disc records made of vinyl plastics and similar pressure-sensitive or heat sensitive materials, has heretofore not been obtainable, except wtih record jackets of very costly multi-piece construction, employing (after the fashion of Fenton Patent No. 2,308,871, dated January 19, 1943) a set of interior glued-in pieces, thicker than the contained record, to relieve the latter of the stack weight or pressure.

My invention, as hereinafter described, provides a one piece disc record jacket which, at no increase in cost of manufacture over conventional one piece constructions, not only prevents (as in Franck, above) any concentration of stack weight on a contained record's sound track, but also actually relieves (as in Fenton, above) such sound track portion of practically all of the stack weight or pressure, this last by causing the weight to be taken on narrow marginal ungrooved disc areas which, in the case of all disc records, of conventional type are always provided in encircling relation to the sensitive sound tracks thereof. This narrow annular area, beyond and outside of the sound track of every disc record, provides a flush non-playing surface onto which the phonograph needle, preparatory to playing of the record, may safely be lowered, without risk of any injury to the record's sensitive playing surface.

Other and further objects and advantages of my invention will be apparent from the following detailed description, taken in connection with the accompanying drawings, in which Fig. 1 is a plan view, illustrating the blank configuration and seam construction for a one piece disc record envelope or jacket, in accordance with my invention.

Figures 1, 2, 3:
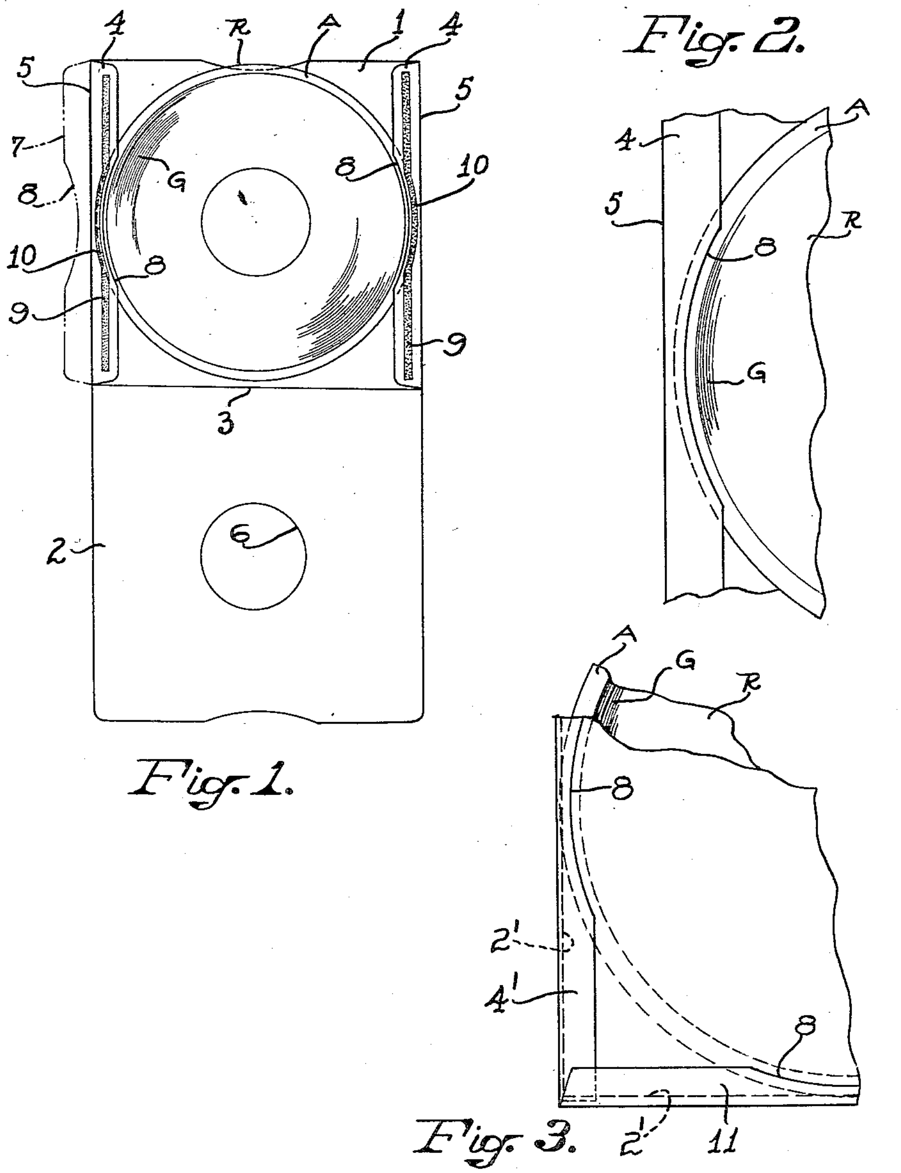
Fig. 2 is a larger scale fragmentary plan view, showing how each seam forming flap of Fig. 1 avoids any overlap of the contained record's sound track.
Fig. 3 is a large scale fragmentary plan view illustrating my invention in a form somewhat modified from that of Fig. 1.

The blank for my improved record envelope is a unitary paper sheet which includes, as shown in Fig. 1, the substantially square front and back wall portions 1 and 2 meeting at a fold line 3 (the bottom boundary of the record pocket) and also a pair of narrow seam-forming flaps 4, 4 which project from the front wall portion 1. These flaps 4, 4 are infolded in the usual manner, on fold lines 5, 5 (the side boundaries of the record pocket) for the adhesive connection thereto of the rear wall portion 2. The wall portions 1 and 2 are of a height and width corresponding substantially to the diameter of the record R for which the envelope is made, and each such portion may, if desired, be provided with the usual central aperture 6, in order to render visible, from either side of the completed envelope or jacket, the name or title which appears at the central ungrooved portion of the disc record R received therein.

The folds 3 and 5, 5 of the blank shown in Fig. 1 are the three boundary folds of the record pocket, each such fold being tangent, midway of its length, to the peripheral edge of the particular size of record R (7″, 10″, 12″ etc.) for which the jacket is designed. According to my invention, each infolded seam forming flap 4, 4 has the middle portion of its free edge cut back, in sufficient amount, lengthwise and crosswise, to avoid any coverage by said flap of the sound track G of record R, while still maintaining said flap's coverage of an appreciable section of the record's narrow annular ungrooved area A, lying between sound track G and the outer peripheral edge of the disc. Preferably, for this purpose, each narrow side flap 4, 4 is of the shape or outline shown by broken lines 7 of Fig. 1, with the middle of its free edge cut back arcuately, as shown at 8, on a radius slightly greater than the outer radius of the record's sound track G, just enough to escape, in said flap's folded over position, any overlay or coverage thereby of said sound track G.

In the manufacture of my improved disc record jacket, from the blank shown in Fig. 1, the two narrow cut back side flaps 4, 4, after being folded inwardly on the lines 5, 5, receive lengthwise stripes of gumming 9, 9; each of these at its middle portion has a slight outward deflection 10 onto the narrowed-down flap portion which overlies the ungrooved marginal area A (but not the sound track area G) of the record R which my jacket is designed to receive. Then the back wall portion 2 is folded over on line 3, for adhesion by said gumming to the infolded side flaps 4, 4, thereby to complete a record envelope or jacket whose bottom is the fold 3, and whose side seams are of the special construction described above.

This seam construction, despite its double thickness of envelope material from end to end, prevents any seam contact with a contained record's playing surface G, and confines such seam or double thickness contact (see Fig. 2) to the record's narrow annular non-playing needle-placing area A, which lies beyond and outside of the sound track G. Thus in a stack or tier of so-jacketed disc records, the weight or pressure of the superposed stack is always taken on the narrow marginal ungrooved record areas A, and never concentrated on the grooved or sound track areas G; the latter, being contacted throughout by only single thickness areas of my improved jackets, are virtually relieved of all stack weight or pressure.

Fig. 3 shows the application of my invention to a record envelope or jacket having an edge closure arrangement substantially as in the aforesaid Modes patent. That is to say, in this envelope or jacket a folded-over back wall portion 2' is overlapped, along two edges, by a pair of infolded narrow seaming flaps, extending from the front wall, not shown, and adhered to the outside of said back wall portion 2'. One of these narrow seaming flaps is a side flap 4', opposite to the conventional side fold, not shown, between the front and rear wall portions, and the other is a bottom flap 11. Both of these exterior seaming flaps 4' and 11, in such an envelope or jacket, are cut back arcuately, as at 8, in their middle portions, and are adhered to back wall 2' by gumming such as shown at 9, 10, in Fig. 1. Since such arcuate cut-backs 8, 8 of these seaming flaps 4' and 11 are on a radius slightly greater than the outer radius of the sound track G of a contained disc record R, it follows, in the envelope or jacket of Fig. 3, exactly as in the envelope or jacket of Figs. 1 and 2, that no part of a contained record's sound track or playing area G is ever contacted by any double-thickness jacket wall area.

Thus in both of the illustrated forms of my invention (each of which represents a type of one-piece record jacket that can readily be manufactured at high speed by conventional envelope-making machinery) there can never be any spoilage or distortion of a contained record's sensitive playing area from pressure or contact of the jacket's double thickness seams. Such seams have contact with a contained record only on portions of its non-playing or needle-placing surface A; and because of this, in a stack or tier of so-jacketed records, the stack weight or pressure, instead of being borne by the respective playing surfaces G, G, is in large measure concentrated on these non-playing surfaces A, A of the records of such stack or tier.

I claim:

1. A jacket or envelope of paper or like material, for relatively snug containment of a phonographic disc record of the type whose sound track or playing area is encircled by a narrow outer non-playing area, said jacket of single-piece substantially square construction being open along its top edge for record entrance thereto and being closed along its other three edges by boundary folds of the jacket material, each adapted for virtual tangency to a contained record's periphery, said jacket comprising substantially square and coextensive front and rear wall portions folded into opposed relation along one of said boundary folds, and a pair of relatively narrow seaming flaps extending from other and different wall portion edges and folded inwardly along said edges to provide the other two boundary folds of said jacket, each said infolded seaming flap having substantially full-length adhesive connection with the opposing wall portion, thereby to form two double thickness seams along and within said two last-mentioned jacket boundary folds, each so-folded seaming flap except at its medial portion being appreciably wider than a contained disc record's outer non-playing area so that the line of such so-folded flap's free longitudinal edge makes two separate crossings of said outer non-playing record area, and each flap's longitudinal edge at said medial portion being cut back in sufficient amount for the so-folded flap to avoid any overlay between said two crossings of a snugly contained disc record's playing area or sound track, while still to maintain between said two crossings its overlay of an appreciable portion of such contained record's outer non-playing area.

2. A jacket or envelope of paper or like material, for relatively snug containment of a phonograph disc record of the type whose sound track or playing area is encircled by a narrow outer non-playing area, said jacket of single-piece substantially square construction being open along its top edge for record entrance thereto and being closed along its other three edges by side and bottom boundary folds of the jacket material, each adapted for virtual tangency to a contained record's periphery, said jacket comprising substantially coextensive front and rear wall portions folded into opposed relation along the bottom boundary fold of the jacket, and a pair of parallel relatively narrow seaming flaps extending from opposite wall portion side edges and folded inwardly along said edges to provide the two side boundary folds of said jacket, each said infolded seaming flap having substantially full-length adhesive connection with the opposing wall portion, thereby to form two double thickness seams along and within said two side boundary folds, each so-folded seaming flap except at its medial portion being appreciably wider than a contained disc record's outer non-playing area so that the line of such so-folded flap's free longitudinal edge makes two separate crossings of said outer non-playing record area, and each flap's longitudinal edge at said medial portion being cut back in sufficient amount for the so-folded flap to avoid any overlay between said two crossings of a snugly contained disc record's playing area or sound track, while still to maintain between said two crossings its overlay of an appreciable portion of such contained record's outer non-playing area.

3. A jacket or envelope of paper or like material, for relatively snug containment of a phonographic disc record of the type whose sound track or playing area is encircled by a narrow outer non-playing area, said jacket of single-piece substantially square construction being open along its top edge for record entrance thereto and being closed along its other three edges by side and bottom boundary folds of the jacket material, each adapted for virtual tangency to a contained record's periphery, said jacket comprising substantially coextensive front and rear wall portions folded into opposed relation along a side boundary fold of said jacket, and a pair of relatively narrow seaming flaps at right angles to each other, extending respectively from a wall portion bottom edge and a wall portion side edge, and folded inwardly along said edges to provide the bottom boundary fold and the other side boundary fold of said jacket, each said infolded seaming flap having substantially full-length adhesive connection with the opposing wall portion, thereby to form two double thickness seams along and within said two last-mentioned jacket boundary folds, each so-folded seaming flap except at its medial portion being appreciably wider than a contained disc record's outer non-playing area so that the line of such so-folded flap's free longitudinal edge makes two separate crossings of said outer non-playing record area, and each flap's longitudinal edge at said medial portion being cut back in sufficient amount for the so-folded flap to avoid any overlay between said two crossings of a snugly contained disc record's playing area or sound track, while still to maintain between said two crossings its overlay of an appreciable portion of such contained record's outer non-playing area.

4. A jacket or envelope of paper or like material, for relatively snug containment of a phonographic disc record of the type whose sound track or playing area is encircled by a narrow outer non-playing area, said jacket of single-piece substantially square construction being open along its top edge for record entrance thereto and being closed along its other three edges by boundary folds of the jacket material, each adapted for virtual tangency to a contained record's periphery, said jacket comprising substantially square and coextensive front and rear wall portions folded into opposed relation along one of said boundary folds, and a pair of relatively narrow seaming flaps extending from other and different wall portion edges and folded inwardly along said edges to provide the other two boundary folds of said jacket, each said seaming flap except at its medial portion being appreciably and substantially uniformly wider than a contained record's outer non-playing area, so that each so-folded flap's free longitudinal edge makes two separate crossings of said non-playing area, and each said infolded seaming flap having substantially full-length adhesive connection with the opposing wall portion, thereby to form two double thickness seams along and within said two last-mentioned jacket boundary folds, and each seaming flap's free longitudinal edge at said medial portion being cut back arcuately from and in between said two crossings on a radius slightly greater than the outer radius of a snugly contained record's sound track or playing area.

5. A jacket or envelope of paper or like material, for relatively snug containment of a phonographic disc record of the type whose sound track or playing area is encircled by a narrow outer non-playing area, said jacket of single-piece substantially square construction being open along its top edge for record entrance thereto and being closed along its other three edges by side and bottom boundary folds of the jacket material, each adapted for virtual tangency to a contained record's periphery, said jacket comprising substantially coextensive front and rear wall portions folded into opposed relation along the bottom boundary fold of the jacket, and a pair of parallel relatively narrow seaming flaps extending from opposite wall portion side edges and folded inwardly along said edges to provide the two side boundary folds of said jacket, each said seaming flap except at its medial portion being appreciably and substantially uniformly wider than a contained record's outer non-playing area, so that each so-folded flap's free longitudinal edge makes two separate crossings of said non-playing area, each said infolded seaming flap having substantially full-length adhesive connection with the opposing wall portion, thereby to form two double thickness seams along and within said two side boundary folds, and each seaming flap's free longitudinal edge at said medial portion being cut back arcuately from and in between said two crossings on a radius slightly greater than the outer radius of a snugly contained record's sound track or playing area.

6. A jacket or envelope of paper or like material, for relatively snug containment of a phonographic disc record of the type whose sound track or playing area is encircled by a narrow outer non-playing area, said jacket of single-piece substantially square construction being open along its top edge for record entrance thereto and being closed along its other three edges by side and bottom boundary folds of the jacket material, each adapted for virtual tangency to a contained record's periphery, said jacket comprising substantially coextensive front and rear wall portions folded into opposed relation along a side boundary fold of said jacket, and a pair of relatively narrow seaming flaps at right angles to each other, extending respectively from a wall portion bottom edge and a wall portion side edge, and folded inwardly along said edges to provide the bottom boundary fold and the other side boundary fold of said jacket, each said seaming flap except at its medial portion being appreciably and substantially uniformly wider than a contained record's outer non-playing area, so that each so-folded flap's free longitudinal edge makes two separate crossings of said non-playing area, each said infolded seaming flap having substantially full-length adhesive connection with the opposing wall portion, thereby to form two double thickness seams along and within said two last-mentioned jacket boundary folds, and each seaming flap's free longitudinal edge at said medial portion being cut back arcuately from and in between said two crossings on a radius slightly greater than the outer radius of a snugly contained record's sound track or playing area.

References Cited in the file of this patent

UNITED STATES PATENTS

| | | |
|---|---|---|
| 1,190,005 | Ralph | July 4, 1916 |
| 2,308,871 | Fenton | Jan. 19, 1943 |
| 2,333,798 | Kner | Nov. 9, 1943 |
| 2,480,416 | Modes | Aug. 30, 1949 |
| 2,512,577 | Franck | June 20, 1950 |

FOREIGN PATENTS

| | | |
|---|---|---|
| 21,009 | Great Britain | 1907 |